United States Patent
Digman

(10) Patent No.: US 10,542,674 B2
(45) Date of Patent: Jan. 28, 2020

(54) METHODS FOR CREATING MERGED TRIPLE WINDROWS

(71) Applicant: CNH Industrial America, LLC, New Holland, PA (US)

(72) Inventor: Michael Jacob Digman, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 301 days.

(21) Appl. No.: 15/599,637

(22) Filed: May 19, 2017

(65) Prior Publication Data

US 2018/0332771 A1 Nov. 22, 2018

(51) Int. Cl.
*A01D 57/20* (2006.01)

(52) U.S. Cl.
CPC .................... *A01D 57/20* (2013.01)

(58) Field of Classification Search
CPC ........ A01D 91/00; A01D 91/04; A01D 57/20; A01D 57/28; A01D 57/30; A01D 57/00; A01D 43/077
See application file for complete search history.

(56) References Cited

U.S. PATENT DOCUMENTS

| 2,678,711 A * | 5/1954 | Otto ................... A01D 41/1243 193/17 |
| 3,214,002 A * | 10/1965 | Kirkpatrick ............ A01D 57/20 198/369.7 |
| 3,976,143 A * | 8/1976 | Rodger .................. A01D 29/00 171/101 |
| 4,429,517 A * | 2/1984 | Lohrentz ................ A01D 57/20 198/314 |
| 4,512,140 A * | 4/1985 | Blakeslee .............. A01D 57/20 56/11.4 |
| 6,145,289 A | 11/2000 | Welsch et al. |
| 6,205,381 B1 * | 3/2001 | Motz .................... A01B 69/008 340/988 |
| 6,205,757 B1 | 3/2001 | Dow et al. |

(Continued)

FOREIGN PATENT DOCUMENTS

| CA | 2486708 A1 * | 6/2005 | ............. A01D 57/20 |
| CA | 2997581 A1 * | 11/2018 | ............. A01D 57/20 |

(Continued)

*Primary Examiner* — Robert E Pezzuto
*Assistant Examiner* — Joan D Misa
(74) *Attorney, Agent, or Firm* — Peter K. Zacharias; Patrick M. Sheldrake

(57) ABSTRACT

In one aspect, a method for creating merged triple windrows within a field may include performing a first cutting pass across a first triple windrow set of the field in a first harvesting direction so as to sever materials from the ground and deposit the severed materials within a first cut strip to form a first deposit of severed materials. The method may also include performing a second cutting pass across a second triple windrow set of the field subsequent to the first cutting pass in a second harvesting direction opposite the first harvesting direction so as to sever materials from the ground and deposit the severed materials within a second cut strip to form a first separate deposit of severed materials. Moreover, the method may include performing subsequent cutting passes across the first triple windrow set to create a merged triple windrow within the first cut strip.

13 Claims, 7 Drawing Sheets

(56) References Cited

U.S. PATENT DOCUMENTS

| | | | |
|---|---|---|---|
| 6,216,071 B1 * | 4/2001 | Motz | A01D 41/12 340/988 |
| 6,732,024 B2 * | 5/2004 | Wilhelm Rekow | A01B 69/008 340/901 |
| 6,862,873 B2 | 3/2005 | Franet | |
| 7,028,459 B2 | 4/2006 | Lohrentz et al. | |
| 7,310,929 B2 * | 12/2007 | Dow | A01B 73/02 56/192 |
| 7,502,678 B2 * | 3/2009 | Diekhans | A01B 69/008 172/4.5 |
| 7,533,516 B2 * | 5/2009 | Pollklas | A01F 29/22 56/250 |
| 7,766,158 B2 | 8/2010 | Laganiere | |
| 8,170,785 B2 * | 5/2012 | Diekhans | G01C 21/20 172/102 |
| 8,209,075 B2 * | 6/2012 | Senneff | A01B 69/008 701/23 |
| 8,738,238 B2 * | 5/2014 | Rekow | G05D 1/0219 701/50 |
| 8,833,044 B2 * | 9/2014 | Hoffman | A01D 57/20 56/10.6 |
| 9,763,377 B2 * | 9/2017 | Yokoyama | A01B 69/00 |
| 10,143,126 B2 * | 12/2018 | Foster | A01B 69/008 |
| 10,198,010 B2 * | 2/2019 | Hiramatsu | A01B 69/008 |
| 2005/0120696 A1 * | 6/2005 | Lohrentz | A01D 57/20 56/192 |
| 2005/0273253 A1 * | 12/2005 | Diekhans | G01C 21/20 701/50 |
| 2005/0284119 A1 * | 12/2005 | Brunnert | A01B 69/008 56/6 |
| 2006/0200294 A1 * | 9/2006 | Scheufler | A01B 79/005 701/50 |
| 2009/0118904 A1 * | 5/2009 | Birnie | G01C 21/00 701/41 |

FOREIGN PATENT DOCUMENTS

| | | | | |
|---|---|---|---|---|
| EP | 1306000 A1 * | 5/2003 | | A01D 43/077 |
| NL | 1003745 C2 * | 2/1998 | | A01D 57/20 |
| SU | 1132839 A1 * | 1/1985 | | |

* cited by examiner

METHODS FOR CREATING MERGED TRIPLE WINDROWS

FIELD OF THE INVENTION

The present subject matter relates generally to performing agricultural harvesting or cutting operations within a field and, more particularly, to a method for creating merged triple windrows within a field when performing a harvesting or cutting operation.

BACKGROUND OF THE INVENTION

A windrower typically consists of a self-propelled tractor or similar vehicle, and a cutting mechanism which is either towed or carried by the tractor. The cutting mechanism is typically referred to as a header, and is supported on the windrower by forwardly projecting arms. The current practice in agriculture is to cut a relatively wide swath of the crop within a range of anywhere between 10 and 19 or more feet in width, and then consolidate the crop into a narrower, substantially continuous windrow, in which form the crop is left to dry in the field until the moisture content has been reduced to a value suitable for subsequent harvesting operations, such as chopping or baling.

To improve the current harvesting practice, efforts have been made to combine multiple windrows together as they are being mowed. This improvement eliminates an intermediate raking operation and also reduces the number of required passes for subsequent harvesting operations (e.g., chopping and baling). With the advent of higher capacity forage harvesters and balers, the ability to merge windrows is becoming a more desirable practice. Windrow merging attachments have, thus, become more prevalent on harvesting machines. Typically, mergers include a conveyor belt for receiving crop from the header and directing the crop laterally for discharge alongside the windrower.

By carefully planning the passes made by the windrower across the field, mergers can be used to create triple windrows. For example, U.S. Pat. No. 7,028,459 (Lohrentz et al.) discloses a method for creating a triple windrow by making three consecutive harvesting passes across the field, with the consecutive passes being made in alternating directions across the field. Unfortunately, such a methodology significantly reduces the amount of drying time available to the windrows formed via the first and second consecutive passes prior to the third windrow being deposited on top of the previous windrows daring the final harvesting pass. Moreover, by making three consecutive passes across portions of the field that are immediately adjacent to one another, the windrower is required to make very sharp turns, thereby increasing the likelihood of crop scuffing as the windrower is being turned around at the edge of the field to make its next pass.

Accordingly, an improved method for creating merged triple windrows would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for creating merged triple windrows within a field. The method may include performing a first cutting pass across a first triple windrow set of the field in a first harvesting direction so as to sever materials from the ground and deposit the severed materials within a first cut strip created by the first cutting pass to form a first deposit of severed materials, wherein the first triple windrow set of the field includes a first adjacent uncut strip of materials disposed along one side of the first cut strip and a second adjacent uncut strip of materials disposed along the opposed side of the first cut strip. The method may also include performing a second cutting pass across a second triple windrow set of the field subsequent to the first cutting pass in a second harvesting direction opposite the first harvesting direction so as to sever materials from the ground and deposit the severed materials within a second cut strip created by the second cutting pass to form a first separate deposit of severed materials, wherein the second triple windrow set is defined by a separate portion of the field than the first triple windrow set. Moreover, the method may include performing a third cutting pass across the first triple windrow set of the field subsequent to the first and second cutting passes to sever the materials within the first adjacent uncut strip of materials and deposit the severed materials within the first cut strip to form a second deposit of severed materials within the first cut strip and performing a fourth cutting pass across the first triple windrow set of the field subsequent to the first and second cutting passes to sever the materials within the second adjacent uncut strip of materials and deposit the severed materials within the first cut strip to form a third deposit of severed materials within the first cut strip.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
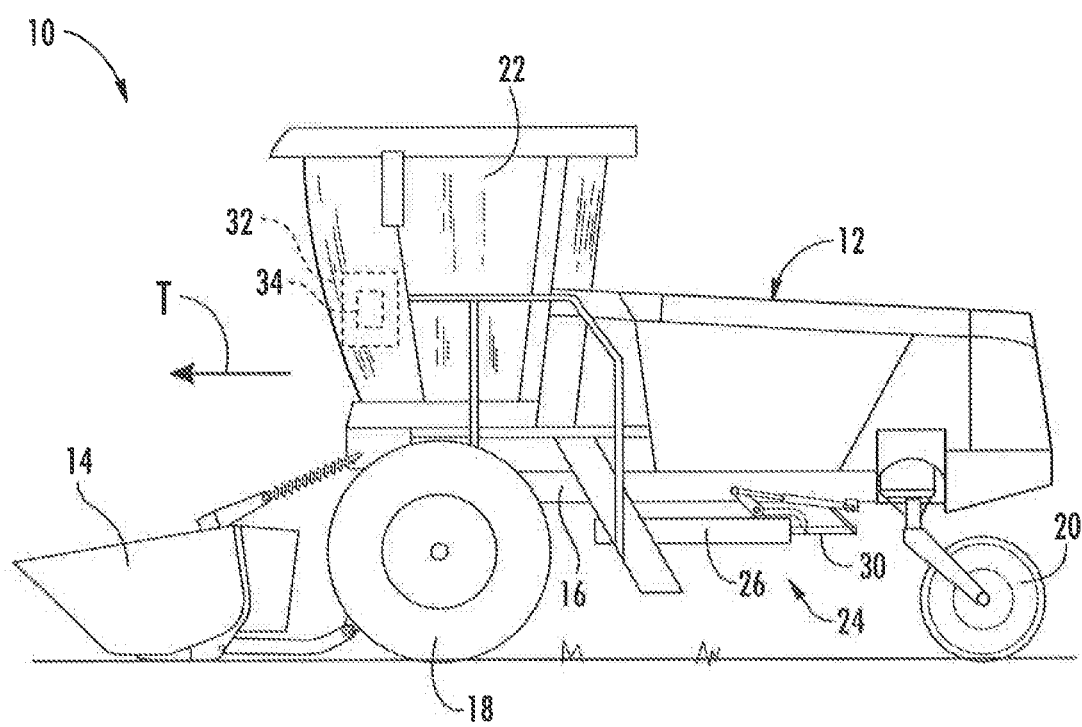
FIG. 1 illustrates a side view of one embodiment of a self-propelled windrower in accordance with aspects of the present subject matter.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for creating merged tripled windrows within a field when performing a harvesting or cutting operation. Specifically, in several embodiments, a self-propelled windrower may be used to make an initial cutting pass across a first section of the field to create a first windrow extending directly behind the windrower. Thereafter, a second cutting pass may be made along a second section of the field that is spaced apart from the first section to allow a separate windrow to be created extending directly behind the windrower. For instance, the second cutting pass may be made across the field at a location such that a distance between the centerlines of the first and second sections of the field is equal to or greater than three times the header width of the windrower. Thereafter, subsequent cutting passes may be made along sections of the field adjacent to the first section and adjacent to the second section to allow separate merged triple windrows to be formed along the first and second sections of the field. As will be described below, such carefully ordered cutting passes may allow for increased drying times prior to merging windrows and may also result in increased crop yield due to the reduced likelihood of crop scuffing.

Referring now to FIG. 1, a side view of one embodiment of a self-propelled windrower 10 used for harvesting a crop material as it travels across a field in a travel direction (e.g., as indicated by arrow "T") is illustrated in accordance with aspects of the present subject matter. In general, the windrower may include a tractor 12 that supports a header 14 configured to sever crop material from the ground using a suitable cutting means (not shown), such as a sickle-bar, rotary cutter or any other suitable cutting device or mechanism. As shown, the tractor 12 may include a chassis 16 configured to support various components of the windrower 10, such as a set of transversely spaced-apart drive wheels 18 for propelling the windrower 10 across the field and one or more rear wheels 20 in the form of castors which facilitate turning of the windrower 10. In addition, an operator cab 22 may be supported by the chassis 16 that houses one or more control devices for controlling the operation of the windrower 10.

Moreover, the windrower 10 may also include a merger assembly 24 supported under the chassis 16 at a location aft of the header 14. In general, the merger assembly 22 may have any suitable configuration known in the art that allows it to function as described herein. For instance, as shown in FIG. 1, the merger assembly 24 may include a frame 26 configured to support an endless loop-style conveyer 28 (FIGS. 2B-2H and FIGS. 3B-3H). As is generally understood, the conveyer 28 may be configured for directing crop material discharged from the header 14 to a location transversely displaced from the longitudinal centerline of the windrower 10 (e.g., by directing the crop material to one side of the windrower 10). In this manner, windrows of harvested crop material may be positioned for combination (i.e., merging) with the harvested crop material from a previous cutting pass made by the windrower.

Additionally, as shown in FIG. 1, the merger assembly 24 may also include an actuation device 30 coupled between the merger frame 26 and the chassis 16 for raising and lowering the frame 26 (and, thus, the conveyor 28) relative to the ground. As such, the conveyer 28 may be moved between a raised or non-working position, at which the severed crop material expelled from the header 14 is directed underneath the conveyer 28 and is deposited onto the ground along the longitudinal centerline of the windrower 10, and a lowered or working position, at which the severed crop material expelled from the header 14 is intercepted by the conveyer 28 and is directed laterally outwardly via the conveyer 28 to one side of the windrower. Thus, when the conveyer 28 is moved to its non-working position, the severed crop material cut by the header 14 is expelled rearwardly therefrom and is deposited onto the ground as a windrow along the longitudinal centerline of the windrower 10 within the lateral space defined between the wheels 18, 20 of the windrower 10. Similarly, when the conveyer 28 is moved to its working position, the severed crop material cut by the header 14 is expelled rearwardly therefrom onto the conveyer 28, thereby allowing the severed crop material to be conveyed laterally to one side of the windrower 10.

Referring still to FIG. 1, the windrower 10 may also include an on-board vehicle controller (indicated by dashed box 32) configured to control the operation of the various components of the vehicle 10. For example, the controller 32 may be communicatively coupled to the actuation device 30 to allow the controller 32 to electronically control the position of the merger assembly 24 (e.g., by moving the merger assembly 24 between its working and non-working positions). In addition, the controller 32 may also be communicatively coupled to one or more actuators (not shown) configured to control the height of the header 14, thereby allowing the controller 32 to electronically raise and lower the header 14 relative to the ground.

Moreover, in several embodiments, the controller 32 may be communicatively coupled to one or more positioning devices (indicated by dashed box 34) configured to determine the exact location of the windrower 10 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 34 may be transmitted to the controller 32 (e.g., in the form coordinates) and subsequently used for guiding the windrower 10. For instance, by referencing an associated field map and/or relevant path planning instructions for the windrower 10, the controller 32 may utilize the location data received from the positioning device(s) 34 to instruct the operator (e.g., via a display provided in the cab 22) regarding which path(s) to take across the field. In particular, as will be described below, the controller 32 may specify the locations of cutting passes to be made across the field to ensure that successive cutting passes are made in accordance with one or more of the embodiments of the methods disclosed herein.

Figure 2A:
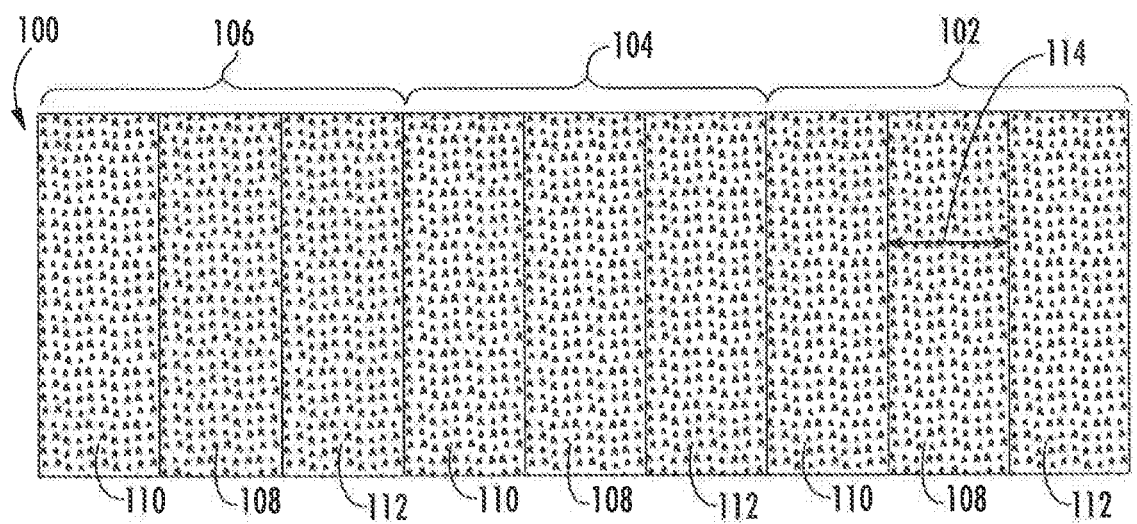
FIG. 2A illustrates a simplified view of a portion of a field including standing crop materials.

Referring now to FIGS. 2A-2H, one embodiment of a method for creating a merged triple windrow within a field will now be described in accordance with aspects of the present subject matter. Specifically, FIG. 2A illustrates a portion of a field 100 prior to a harvesting operation being performed therein and FIGS. 2B-2H illustrate consecutive cutting passes made by a windrower when performing the disclosed method. For purposes of discussion, the embodiment of the harvesting method shown in FIGS. 2B-2H will be described herein as being performed using the windrower 10 described above with reference to FIG. 1. However, it should be appreciated that the disclosed method may be performed using any other suitable windrower or any other suitable work vehicle have any suitable vehicle configuration.

FIG. 2A illustrates a field 100 of standing crop materials prior to performance of the harvesting operation, with the standing materials being generally indicated by the cross-hatching contained within the schematic view of the field 100. For purposes of describing aspects of the disclosed method, the field 100 is illustrated as being divided into a plurality of "triple windrow sets", with each triple windrow set including three adjacent sections or strips of the field 100. As such, when the standing crop material of the three adjacent field strips of each triple windrow set is cut using the windrower 10, the severed material may be merged or deposited together to form a triple windrow. For instance, FIG. 2A illustrates three separate triple windrow sets (i.e., a first triple windrow set 102, a second triple windrow set 104, and a third triple windrow set 106), with each triple windrow set 102, 104, 106 including a central field strip 108 and first and second side field strips 110, 112 disposed along either side of the central field strip 108. As will be described in greater detail below, the central field strip 108 of a given triple windrow set 102, 104, 106 may be cut initially by the windrower 10 to create an initial deposit of severed materials along such central field strip 108. Thereafter, following one or more intermediate cutting passes along other portions of the field 100, the first and second side field strips 110, 112 may be cut and deposited onto and/or adjacent to the initial deposit of several materials to create a triple windrow along the central field strip 108.

It should be appreciated that FIG. 2A simply illustrates a portion of the above-described field 100. Thus, one of ordinary skill in the art will readily appreciate that, although only three triple windrow sets 102, 104, 106 are shown in FIG. 2A (along with the nine associated field strips 108, 110, 112), the field 100 may generally include any number of triple windrow sets and associated field strips. It should also be appreciated that each field strip 108, 110, 112 may generally define a width 114 corresponding to a width 116 (FIG. 2B) of the header 14 of the windrower 10. Thus, as the windrower 10 makes each cutting pass across the field 100 along a centerline of each field strip 108, 110, 112, the standing materials contained within such field strip may be severed from the ground and subsequently deposited onto the ground to form a windrow.

Figure 2B:
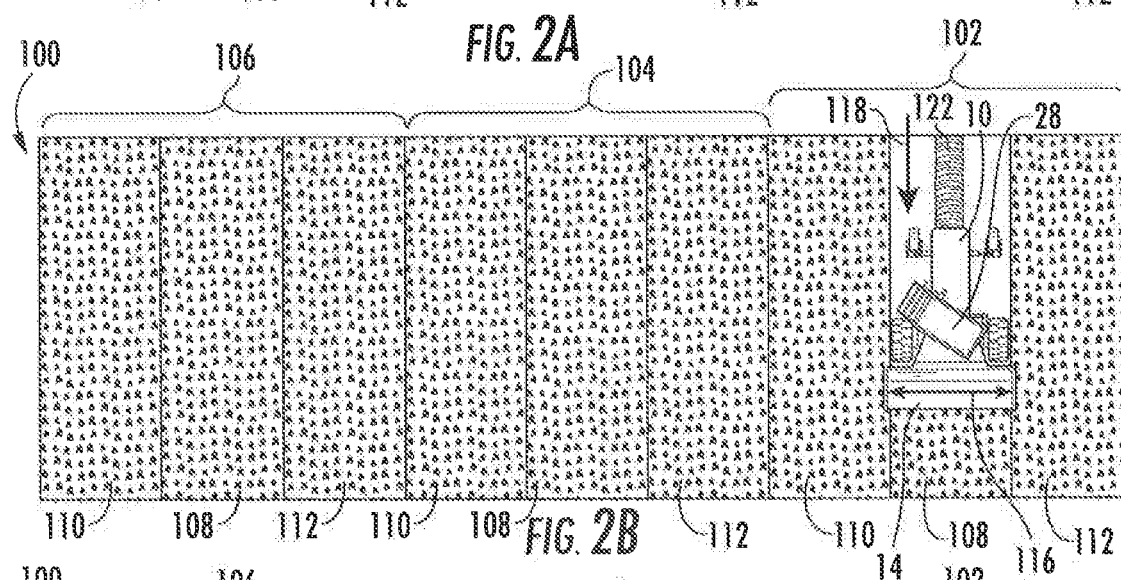
FIGS. 2B-2H illustrate consecutive cutting passes made across the field shown in FIG. 2A when implementing one embodiment of a method for creating a merged triple windrow in accordance with aspects of the present subject matter.

When initiating the harvesting operation, the windrower 10 may make an initial or first cutting pass along the central field strip 108 of one of the triple windrow sets in a first harvesting direction (e.g., as indicated by arrow 118 in FIG. 2B). For instance, as shown in FIG. 2B, the windrower 10 may be configured to initially cut the standing crop material contained within the central field strip 108 of the first triple windrow set 102. In such instance, the header 14 of windrower 10 may be aligned with the central field strip 108 directly between the first and second side strips 110, 112 of the first triple windrow set 102 while the merger assembly 24 of the windrower 10 may be located at its raised position to allow the severed crop material to be deposited onto the ground directly below the windrower 10 along its longitudinal centerline. Thus, as the windrower 10 moves across the central field strip 108 of the first triple windrow set 102 in the first harvesting direction 118, the header 14 may sever the crop material from the ground and project the severed material rearwardly underneath the raised merger assembly 24. As such, the severed materials may fall onto the ground to form a first windrow or deposit of severed materials 122 extending behind the windrower 10 along the central field strip 108 of the first triple windrow set 102.

As indicated above, the windrower 10 may be guided based on the GPS or other location data provided by its positioning device(s) 34. Thus, the windrower 10 may be aligned relative to the central field strip 108 of the first triple windrow set 102 for making the first cutting pass using the GPS/location data. Similarly, the GPS/location data may be utilized for guiding the windrower 10 when making each subsequent cutting pass, thereby allowing the windrower 10 to be accurately positioned within the field.

Figure 2C:
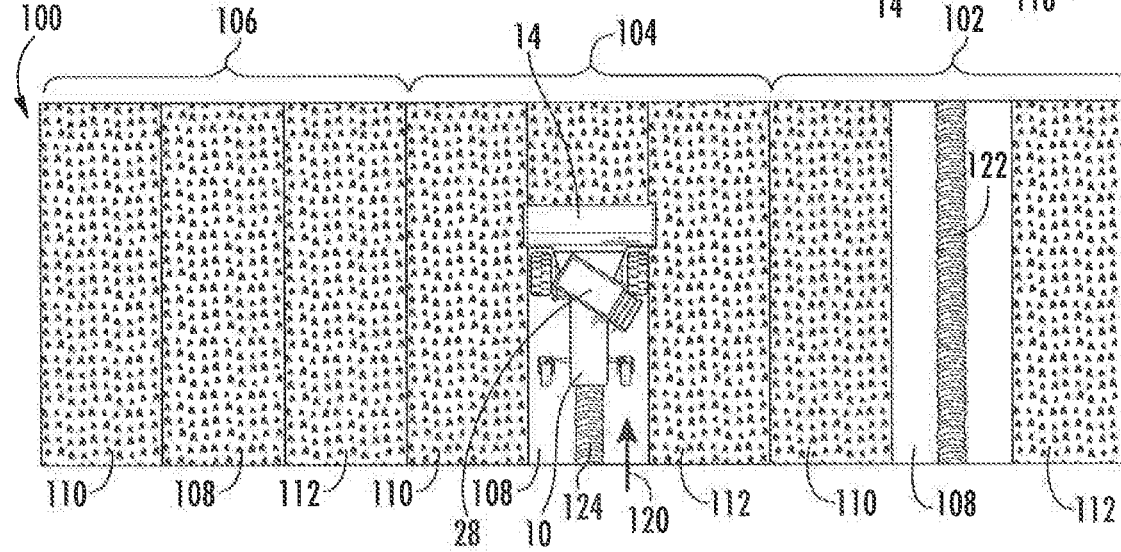

Following the first cutting pass, the windrower 10 may be turned around to allow a second cutting pass to be made across the field 100 in a second harvesting direction opposite the first harvesting direction 118 (e.g., as indicated by arrow 120 in FIG. 2C). As shown in FIG. 2C, in accordance with aspects of the present subject matter, the second cutting pass may be made across the central field strip 108 of a different triple windrow set of the field 100, such as by performing the second cutting pass across the central field strip 108 of the second triple windrow set 104. In such an embodiment, the header 14 may be aligned with the central field strip 108 directly between the first and second side strips 110, 112 of the second triple windrow set 104 while the merger assembly 24 may be located at its raised position to allow the severed crop material to be deposited onto the ground directly below the windrower 10 along its longitudinal centerline. Thus, as the windrower 10 moves across the central field strip 108 of the second triple windrow set 104 in the second harvesting direction 120, the header 14 may sever the crop material from the ground and project the severed material rearwardly underneath the raised merger assembly 24. As such, the severed materials may fall onto the ground to form a first windrow or deposit of severed materials 124 extending behind the windrower 10 along the central field strip 108 of the second triple windrow set 104.

Figure 2D:
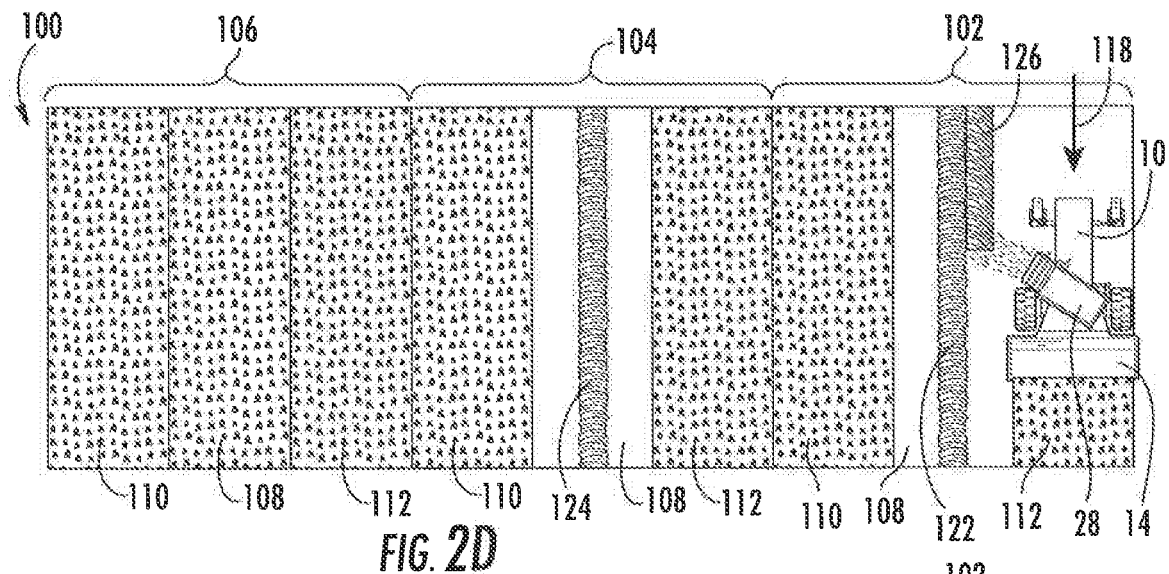

Upon completion of the second cutting pass, the windrower 10 may again be turned around to allow a third cutting pass to be made across the field 100 in the first harvesting direction 118. In several embodiments, the third cutting pass may be made across one of the side field strips 110, 112 of the first triple windrow set 102 (e.g., depending on which side of the windrower 10 that the merger assembly 24 is configured to deposit materials). For example, as shown in FIG. 2D, the third cutting pass is being made across the second side field strip 112 of the first triple windrow set 102 due to the merger assembly 24 being configured to laterally deposit several crop material along the right side of the windrower 10. However, if the merger assembly 24 was, instead, configured to laterally deposit severed crop material along the left side of the windrower 10, the third cutting pass may, for example, be made across the first side field strip 110 of the first triple windrow set 102. Regardless, when making the third cutting pass, the merger assembly 24 may be moved to its lowered or working position. Thus, as the windrower 10 moves across the side field strip 112 of the first triple windrow set 102 in the first harvesting direction 118, the header 14 may sever the crop material from the ground and project the severed material rearwardly onto the conveyer 28 of the merger assembly 24. As shown in FIG. 2D, the severed crop material may then be conveyed laterally to the side of the windrower 10 via the conveyer 28 and deposited into the central field strip 108 of the first triple windrow set 102, thereby creating a second windrow or deposit of severed materials 126 within the central field strip 108 of the first triple windrow set 102 that is located on top of and/or adjacent to the first deposit of severed materials 122.

Figure 2E:
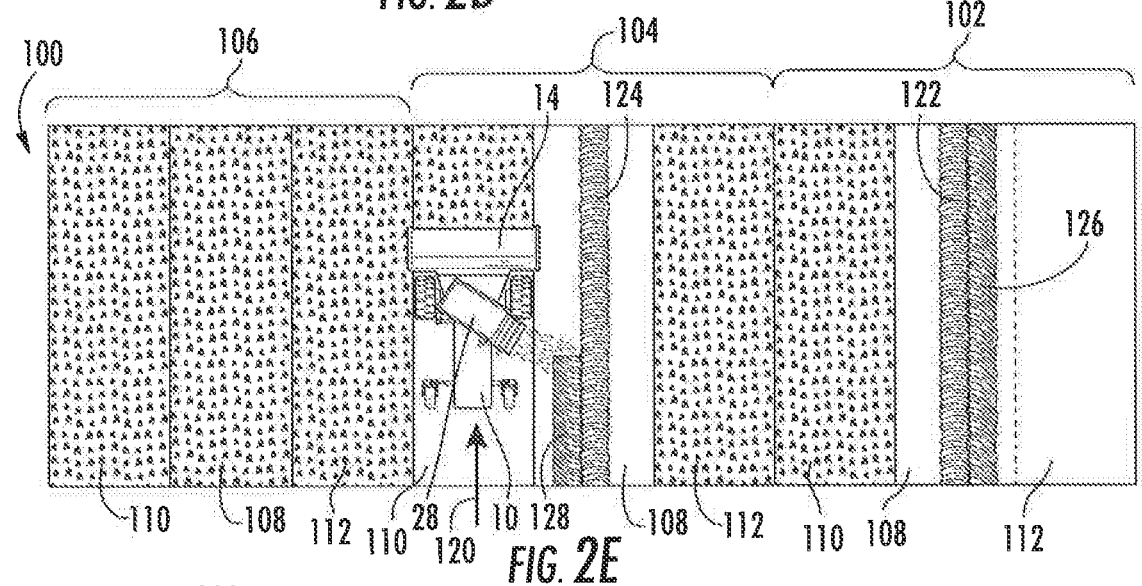

Referring now to FIG. 2E, following completion of the third cutting pass, the windrower 10 may be turned around to allow a fourth cutting pass to be made across the field 100 in the second harvesting direction 120. In several embodiments, the fourth cutting pass may be made across one of the side field strips 110, 112 of the second triple windrow set 104 (e.g., again depending on which side of the windrower 10 that the merger assembly 24 is configured to deposit materials). For example, as shown in FIG. 2E, the fourth cutting pass is being made across the first side field strip 110 of the second triple windrow set 104 since the merger assembly 24 is configured to laterally deposit severed crop material along the right side of the windrower 10. Similar to that described, above for the third cutting pass, the merger assembly 24 may be moved to its lowered or working position when making the fourth cutting pass. Thus, as the windrower 10 moves across the side field strip 110 of the second triple windrow set 104 in the second harvesting direction 120, the header 14 may sever the crop material from the ground and project the severed material rearwardly onto the conveyor 28 of the merger assembly 24. As shown in FIG. 2E, the severed crop material may then be conveyed laterally to the side of the windrower 10 via the conveyor 28 and deposited into the central field strip 108 of the second triple windrow set 104, thereby creating a second windrow or deposit of severed materials 128 within the central field strip 108 of the second triple windrow set 104 that is located on top of and/or adjacent to the first deposit of severed materials 124.

Figure 2F:
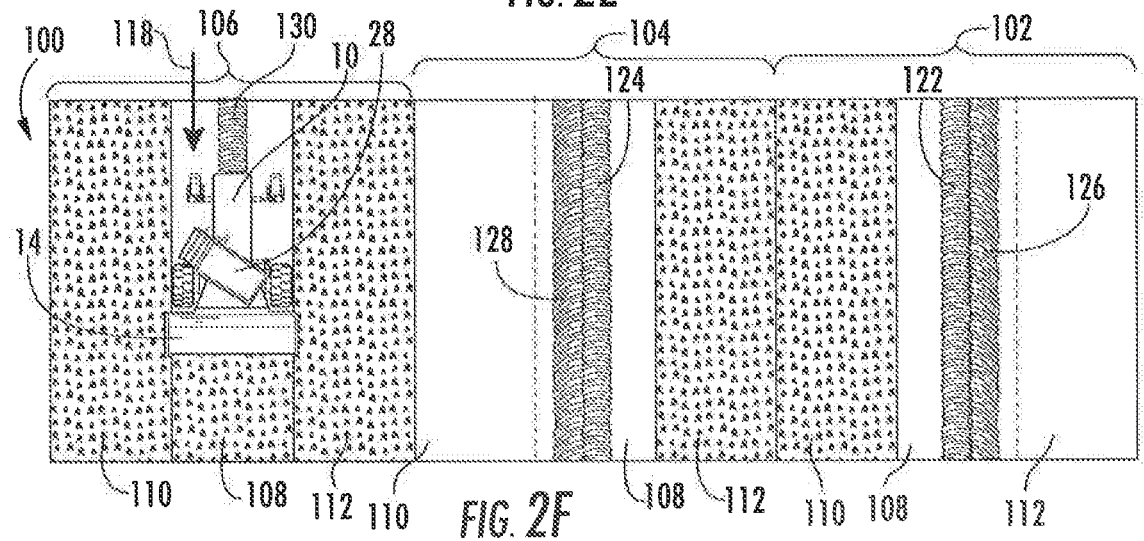

Following the fourth cutting pass, the windrower 10 may be turned around to allow a fifth cutting pass to be made across the field 100 in the first harvesting direction 118. As shown in FIG. 2F, in accordance with aspects of the present subject matter, the fifth cutting pass may be made across the central field strip 108 of a triple windrow set separate from the first and second triple windrow sets 102, 104, such as by performing the fifth cutting pass across the central field strip 108 of the third triple windrow set 106. In such an embodiment, the header 14 may be aligned with the central field strip 108 directly between the first and second side strips 110, 112 of the third triple windrow set 106 while the merger assembly 25 may be located at its raised position to allow the severed crop material to be deposited onto the ground directly below the windrower 10. Thus, as the windrower 10 moves across the central field strip 108 of the third triple windrow set 106 in the first harvesting direction 118, the header 14 may sever the crop material from the ground and project the severed material rearwardly underneath the raised merger assembly 24. As such, the severed materials may fall onto the ground to form a first windrow or deposit of severed materials 130 extending behind the windrower 10 along the central field strip 108 of the third triple windrow set 106.

Figure 2G:
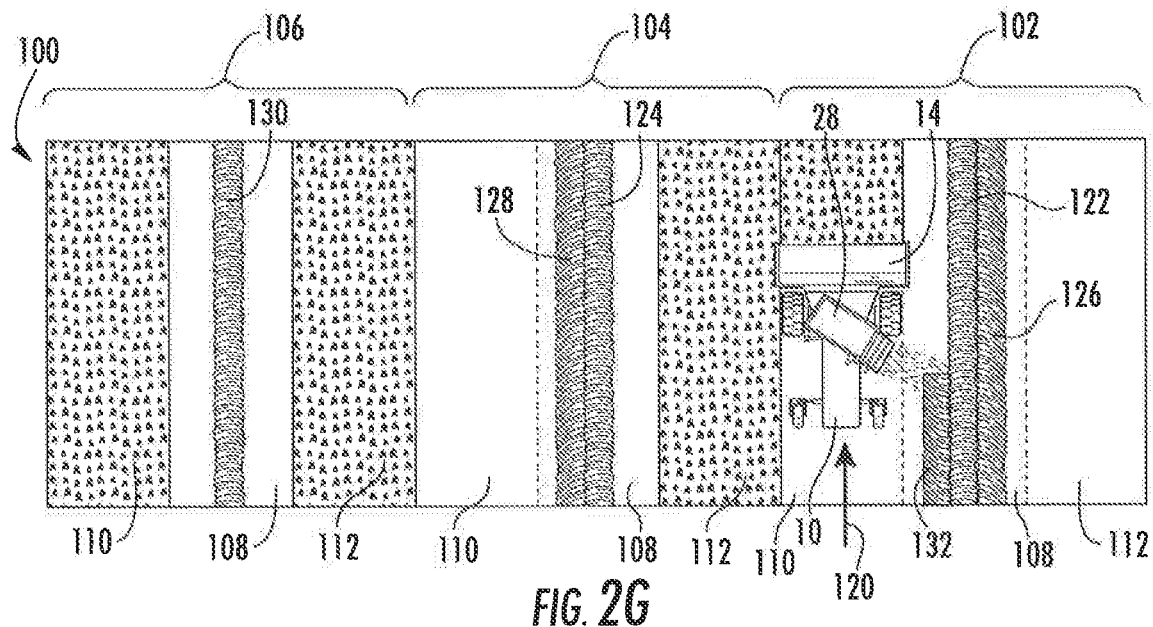

Upon completion of the fifth cutting pass, the windrower 10 may again be turned around to allow a sixth cutting pass to be made across the field 100 in the second harvesting direction 120. In several embodiments, the sixth cutting pass may be made across the remaining side field strip of the first triple windrow set 102. For example, as shown in FIG. 2G, the sixth cutting pass is being made across the first side field strip 110 of the first triple windrow set 102. Similar to that described above for the third and fourth cutting passes, the merger assembly 24 may be moved to its lowered or working position when making the sixth cutting pass. Thus, as the windrower 10 moves across the remaining side field strip 110 of the first triple windrow set 102 in the second harvesting direction 120, the header 104 may sever the crop material from the ground and project the severed material rearwardly onto the conveyor 28 of the merger assembly 24. As shown in FIG. 2G, the severed crop material may then be conveyed laterally to the side of the windrower 10 via the conveyor 28 and deposited into the central field strip 108 of the first triple windrow set 102, thereby creating a third and final windrow or deposit of severed materials 132 within the central field strip 108 of the first triple windrow set 102 that is located on top of and/or adjacent to the existing first and second deposits of severed materials 122, 126. As a result, the first, second, and third deposits of severed materials 122, 126, 132 may collectively form a merged triple windrow extending along the central field strip 108 of the first windrow set 102.

Figure 2H:
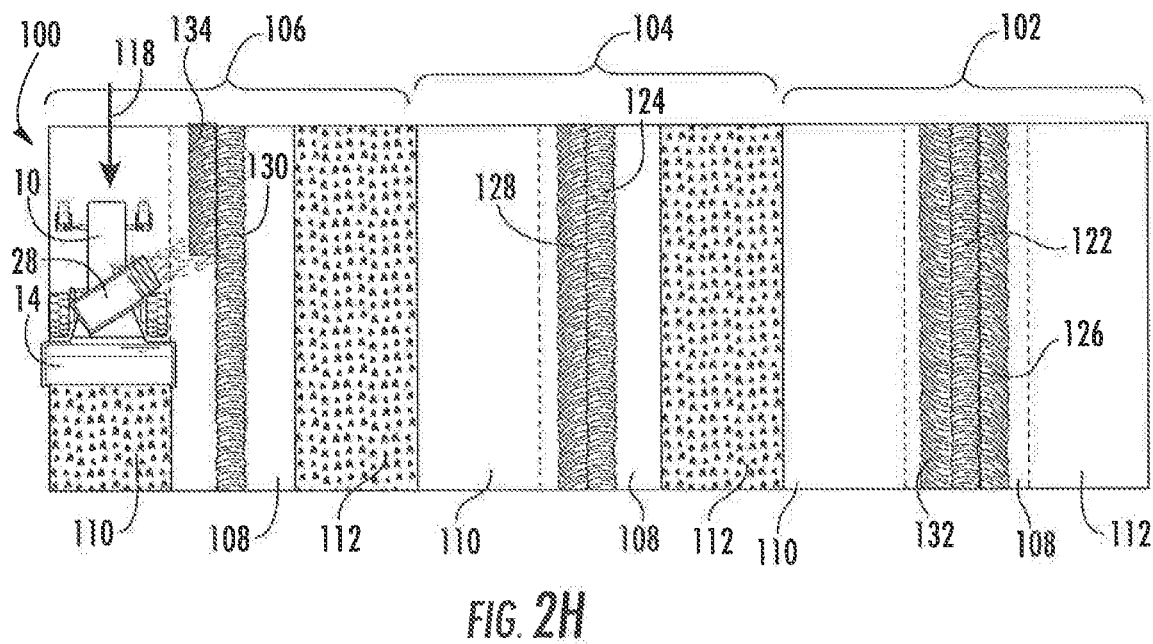

Referring now to FIG. 2H, following the sixth cutting pass, the windrower 10 may be turned around to allow a seventh cutting pass to be made across the field 100 in the first harvesting direction 118. In several embodiments, the seventh cutting pass may be made across one of the side field strips 110, 112 of the third triple windrow set 106 (e.g., depending on which side of the windrower 10 that the merger assembly 24 is configured to deposit materials). For example, as shown in FIG. 2H, the seventh cutting pass is being made across the first side field strip 110 of the third triple windrow set 160 since the merger assembly 24 is configured to laterally deposit several crop material along the right side of the windrower 10. Similar to the third, fourth, and sixth cutting passes described above, the merger assembly 24 may be moved to its lowered or working position when snaking the seventh cutting pass. Thus, as the windrower 10 moves across the side field strip 110 of the third triple windrow set 106 in the first harvesting direction 118, the header 14 may sever the crop material from the ground and project the severed material rearwardly onto the conveyor 28 of the merger assembly 24. As shown in FIG. 2H, the severed crop material may then be conveyed laterally to the side of the windrower 10 via the conveyor 28 and deposited into the central field strip 108 of the third triple windrow set 102, thereby creating a second windrow or deposit of severed materials 134 within the central field strip 108 of the third triple windrow set 106 that is located on top of and/or adjacent to the first deposit of severed materials 130.

The pattern of cutting passes described above with reference to FIGS. 2B-2H may then be continued while the harvesting operation is being performed across the remainder of the field 100. For instance, following the seventh cutting pass, an eighth cutting pass may be made across the central field strip 108 of yet another triple windrow set separate from the first, second, and third triple windrow sets 102, 104, 106 (e.g., a fourth triple windrow set (not shown) located adjacent to the third triple windrow set 106) to create an initial windrow or deposit of severed materials within the central field strip 108 of such triple windrow set. Thereafter, a subsequent cutting pass may be made across the remaining side field strip of the second triple windrow set 104 (e.g., the second side field strip 112) to allow a third windrow or deposit of severed materials to be deposited within the central field strip 108 of the second triple windrow set 104, thereby forming a merged triple windrow that extends across the central field strip 108 of the second triple windrow set 104.

It should be appreciated that the above described methodology may provide various advantages over conventional windrowing methods that utilize three consecutive cutting passes to create a merged triple windrow. Specifically, by allowing for one or more intermediate cutting passes to be performed across the field 100 on-between the cutting pass forming the first deposit of severed materials within a given central field strip 108 and the cutting pass forming the second deposit of severed materials within such central field strip 108, the first deposit of severed materials may be provided additional drying time prior to the merging of the second deposit of severed materials therewith. For example, as shown in FIGS. 2B-2D, after making the first cutting pass to form the first deposit of materials 122 within the central field strip 108 of the first triple windrow set 102, the second cutting pass is performed across the second triple windrow set 104 prior to forming the second deposit of materials 126 within the central field strip 108 of the first triple windrow set 102, thereby providing additional drying time for the first deposit of materials 122. Similarly, as described above, one or more intermediate cutting passes may also be performed in-between the cutting pass forming the second deposit of severed materials within a given central field strip 108 and the cutting pass forming the third deposit of severed materials within such central field strip 108, thereby providing additional drying time for the second deposit of materials.

Moreover, by increasing the spacing between consecutive passes across the field 100 (e.g., as opposed to performing three consecutive pass along the same triple windrow set), the windrower 10 may be allowed to have a larger turning radius when turning around following the completion of a cutting pass. Such wider turns may result in reduced scuffing of the crop by the windrower 10, thereby increasing the yield of usable crop materials. For instance, as shown in the illustrated embodiment, the central field strips 108 of adjacent windrow sets 102, 104, 106 are spaced apart from one another across the field by a distance generally equal to three times the header width 116. Thus, as an example, the windrower 10 may be allowed to make a substantially wide turn when transitioning from the first cutting pass (FIG. 2B) to the second cutting pass (FIG. 2C).

Figure 3A:
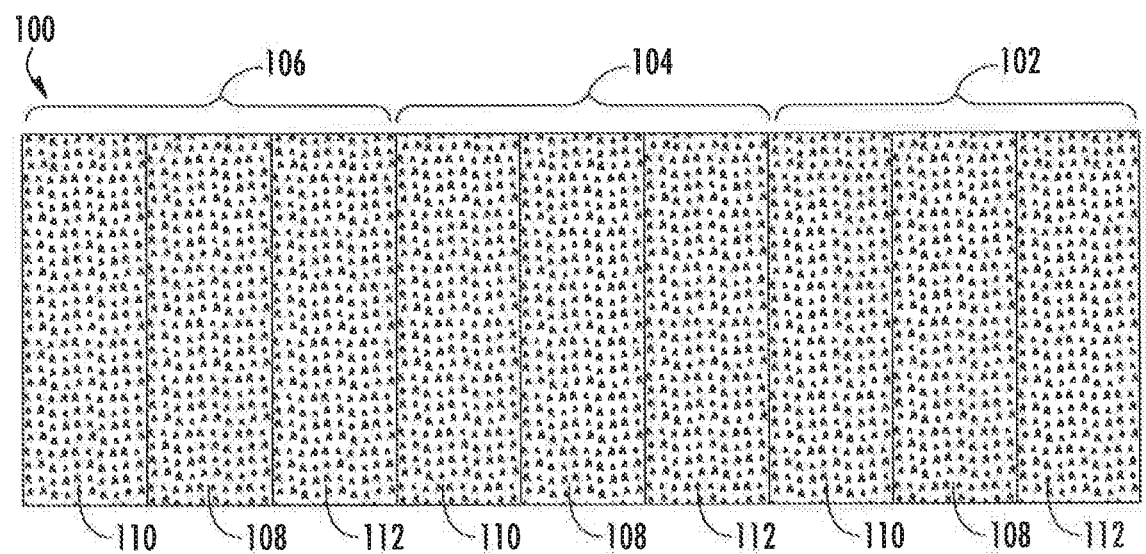
FIG. 3A illustrates another view of the portion of the field shown in FIG. 2A.

Referring now to FIGS. 3A-3H, another embodiment of a method for creating a merged triple windrow within a field is illustrated in accordance with aspects of the present subject matter. Specifically, FIG. 3A illustrates a portion of a field 100 prior to a harvesting operation being performed therein and FIGS. 3B-3H illustrate consecutive cutting passes made by a windrower 10 when performing the disclosed method. For purposes of discussion, the embodiment of the harvesting method shown in FIGS. 3B-3H will be described as being performed using the windrower 10 described above with reference to FIG. 1. However, it should be appreciated that the disclosed method may be performed using any other suitable windrower or any other suitable work vehicle have any suitable vehicle configuration.

As shown in FIG. 3A, for purposes of description, the same portion of the field 100 described above with reference to FIGS. 2A-2H is illustrated. Thus, the field 100 is shown as including three separate triple windrow sets (e.g., a first triple windrow set 102, a second triple windrow set 104 and a third triple windrow set 106), with each triple windrow set 102, 104, 106 including three adjacent field strips (e.g., a central field strip 108 and first and second side field strips 110, 112 disposed along either side of the central field strip 108). Additionally, similar to that described above, each field strip 108, 110, 112 may generally define a width 114 (FIG. 2A) corresponding to the width 116 (FIG. 2B) of the header 14 of the windrower 10.

Figure 3B:
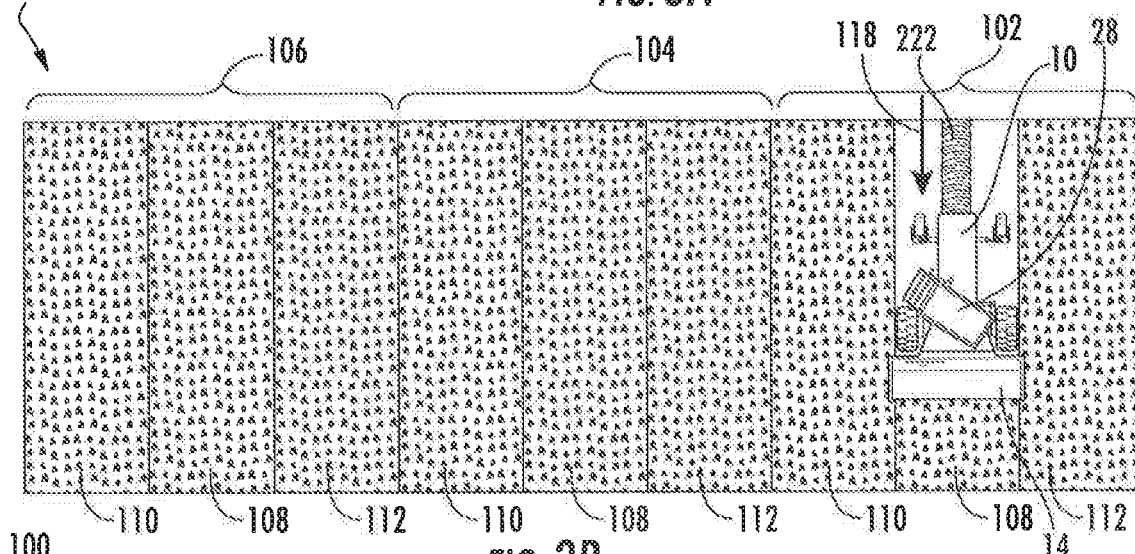
FIGS. 3B-3H illustrate consecutive cutting passes made across the field shown in FIG. 3A when implementing another embodiment of a method for creating a merged triple windrow in accordance with aspects of the present subject matter.

When initiating the harvesting operation, the windrower 10 may make an initial or first cutting pass along the central field strip 108 of one of the triple windrow sets in a first harvesting direction (e.g., as indicated by arrow 118 in FIG. 3B). For instance, as shown in FIG. 3B, the windrower 10 may be configured to initially cut the standing crop material contained within the central field strip 108 of the first triple windrow set 102. In such instance, the header 14 of windrower 10 may be aligned with the central field strip 108 directly between the first and second side strips 110, 112 of the first triple windrow set 102 while the merger assembly 24 of the windrower 10 may be located at its raised position to allow the severed crop material to be deposited onto the ground directly below the windrower 10. Thus, as the windrower 10 moves across the central field strip 108 of the first triple windrow set 102 in the first harvesting direction 118, the header 14 may sever the crop material from the ground and project the severed material rearwardly underneath the raised merger assembly 24. As such, the severed materials may fall onto the ground to form a first windrow or deposit of severed materials 222 extending behind the windrower 10 along the central field strip 108 of the first triple windrow set 102.

Figure 3C:
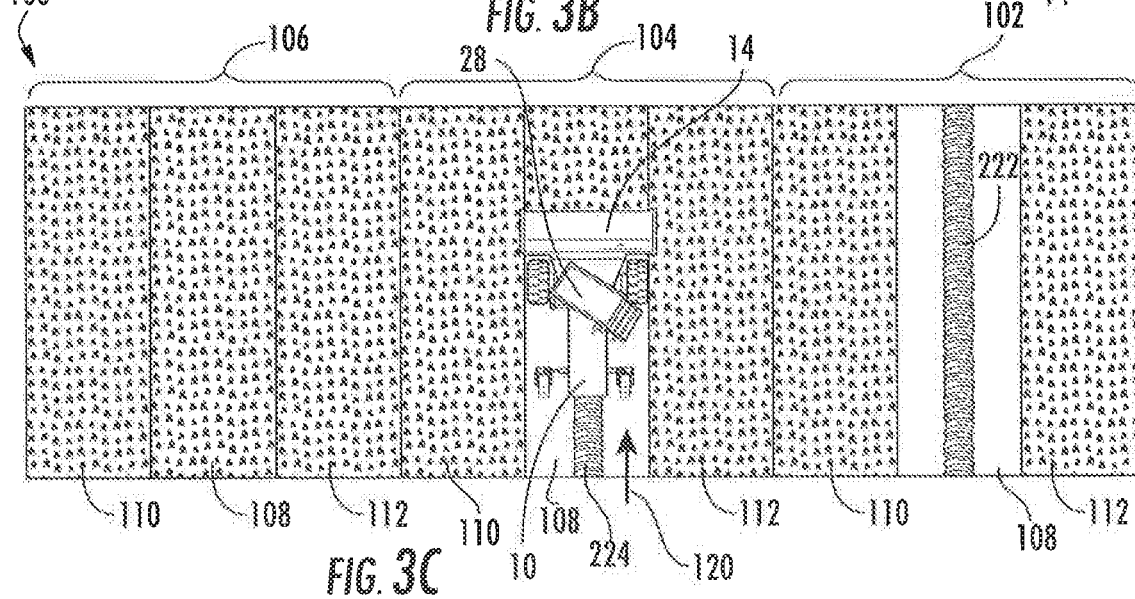

Following the first cutting pass, the windrower 10 may be turned around to allow a second cutting pass to be made across the field 100 in a second harvesting direction opposite the first harvesting direction 118 (e.g., as indicated by arrow 120 in FIG. 3C). As shown in FIG. 3C, in accordance with aspects of the present subject matter, the second cutting pass may be made across the central field strip 108 of a different triple windrow set, such as by performing the second cutting pass across the central field strip 108 of the second triple windrow set 104. In such an embodiment, the header 14 may be aligned with the central field strip 108 directly between the first and second side strips 110, 112 of the second triple windrow set 104 while the merger assembly 24 may be located at its raised position to allow the severed crop material to be deposited onto the ground directly below the windrower 10. Thus, as the windrower 10 moves across the central field strip 108 of the second triple windrow set 14 in the second harvesting direction 120, the header 14 may sever the crop material from the ground and project the severed material rearwardly underneath the raised merger assembly 24. As such, the severed materials may fall onto the ground to form a first windrow or deposit of severed materials 224 extending behind the windrower 10 along the central field strip 108 of the second triple windrow set 104.

Figure 3D:
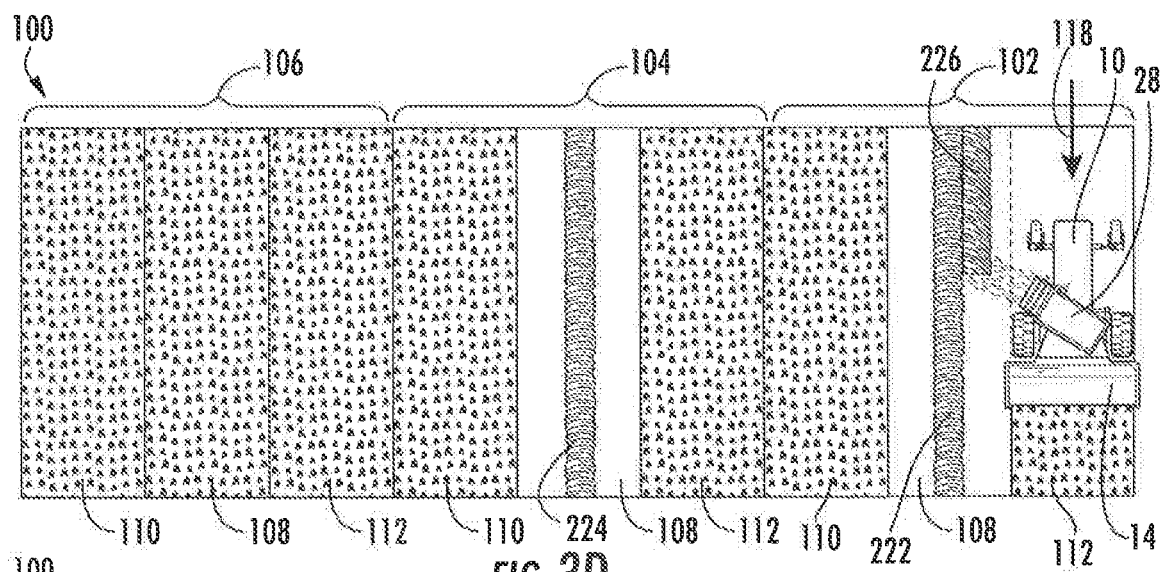

Upon completion of the second cutting pass, the windrower 10 may again be turned around to allow a third cutting pass to be made across the field 100 in the first harvesting direction 118. In several embodiments, the third cutting pass may be made across one of the side field strips 110, 112 of the first triple windrow set 102 (e.g., depending on which side of the windrower 10 that the merger assembly 24 is configured to deposit materials). For example, as shown in FIG. 3D, the third cutting pass is being made across the second side field strip 112 of the first triple windrow set 102 since the merger assembly 24 is configured to laterally deposit severed crop material along the right side of the windrower 10. However, if the merger assembly 24 was, instead, configured to laterally deposit severed crop material along the left side of the windrower 10, the third cutting pass may, for example, be made across the first side field strip 110 of the first triple windrow set 102. Regardless, when making the third cutting pass, the merger assembly 23 may be moved to its lowered or working position. Thus, as the windrower 10 moves across the side field strip 112 of the first triple windrow set 102 in the first harvesting direction 118, the header 14 may sever the crop material from the ground and project the severed material rearwardly onto the conveyer 28 of the merger assembly 24. As shown in FIG. 3D, the severed crop material may then be conveyed laterally to the side of the windrower 10 via the conveyer 28 and deposited into the central field strip 108 of the first triple windrow set 102, thereby creating a second windrow or deposit of severed materials 226 within the central field strip 108 of the first triple windrow set 102 that is located on top of and/or adjacent to the first deposit of severed materials 222.

Figure 3E:
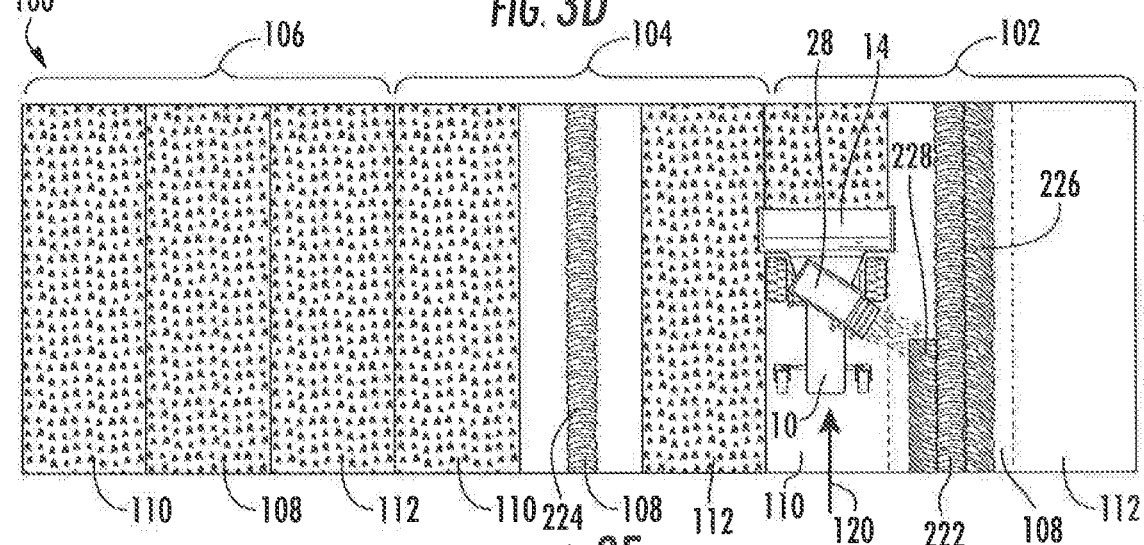

Referring now to FIG. 3E, following completion of the third cutting pass, the windrower 10 may be turned around to allow a fourth cutting pass to be made across the field 100 in the second harvesting direction 120. In several embodiments, the fourth cutting pass may be made across the remaining side field strip of the first triple windrow set 102. For example, as shown in FIG. 3E, the fourth cutting pass is being made across the first side field strip 110 of the first triple windrow set 102. Similar to that described above for the third cutting pass, the merger assembly 24 may be moved to its lowered or working position when making the fourth cutting pass. Thus, as the windrower 10 moves across the remaining side field strip 110 of the first triple windrow set 102 in the second harvesting direction 120, the header 14 may sever the crop material from the ground and project the severed material rearwardly onto the conveyer 28 of the merger assembly 24. As shown in FIG. 3E, the severed crop material may then be conveyed laterally to the side of the windrower 10 via the conveyer 28 and deposited into the central field strip 108 of the first triple windrow set 102, thereby creating a third and final windrow or deposit of severed materials 228 within the central field strip 108 of the first triple windrow set 102 that is located on top of and/or adjacent to the existing first and deposits of severed materials 222, 226. As a result, the first, second, and third deposits of severed materials 222, 226, 228 may collectively form a merged triple windrow extending along the central field strip 108 of the first triple windrow set 102.

Figure 3F:
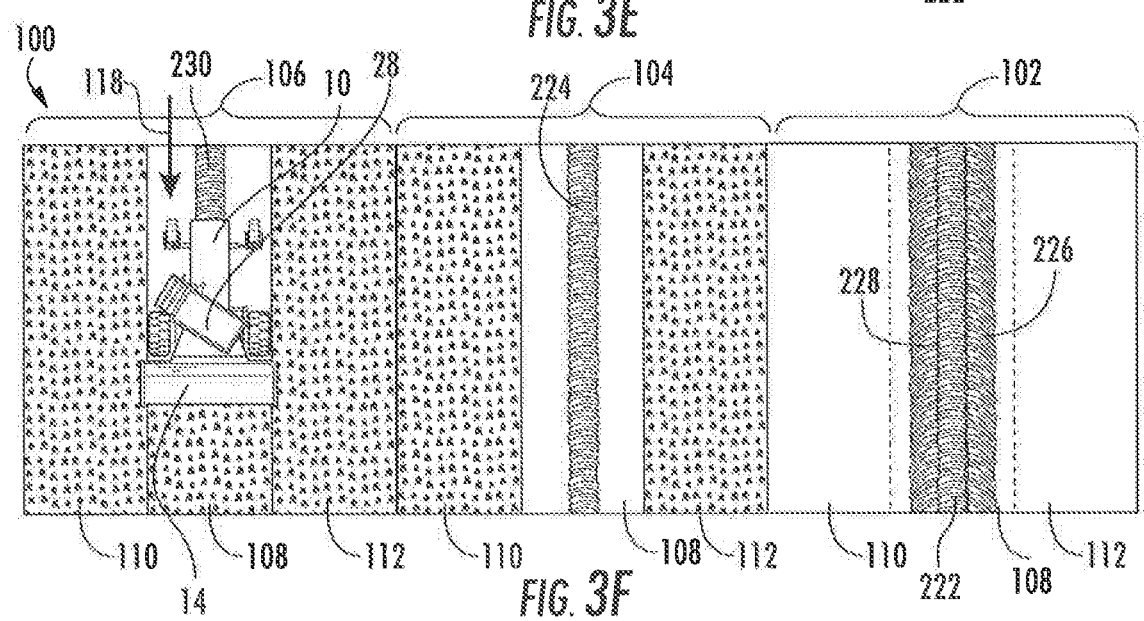

Following the fourth cutting pass, the windrower 10 may be turned around to allow a fifth cutting pass to be made across the field 100 in the first harvesting direction 118. As shown in FIG. 3F, in accordance with aspects of the present subject matter, the fifth cutting pass may be made across the central field strip 108 of a triple windrow set separate from the first and second triple windrow sets 102, 104, such as by performing the fifth cutting pass across the central field strip 108 of the third triple windrow set 106. In such an embodiment, the header 10 may be aligned with the central field strip 108 directly between the first and second side strips 110, 112 of the third triple windrow set 106 while the merger assembly 24 may be located at its raised position to allow the severed crop material to be deposited onto the ground directly below the windrower 10. Thus, as the windrower 10 moves across the central field strip 108 of the third triple windrow set 106 in the first harvesting direction 118, the header 14 may sever the crop material from the ground and project the severed material rearwardly underneath the raised merger assembly 24. As such, the severed materials may fail onto the ground to form a first windrow or deposit of severed materials 230 extending behind the windrower 10 along the central field strip 108 of the third triple windrow set 106.

Figure 3G:
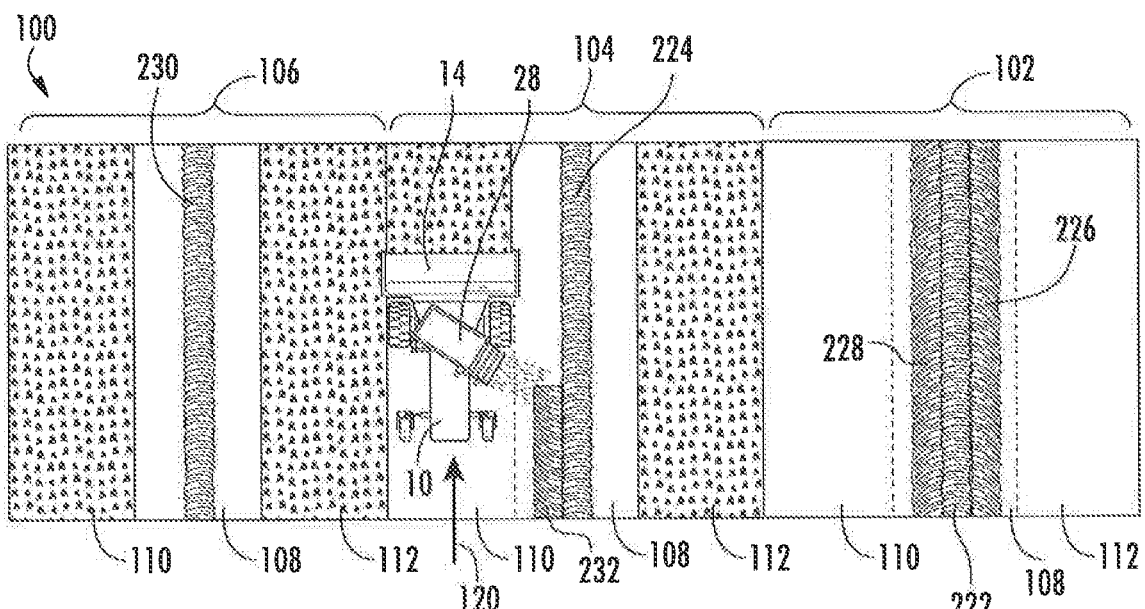

Upon completion of the fifth cutting pass, the windrower 10 may again be turned around to allow a sixth cutting pass to be made across the field 100 in the second harvesting direction 120. As shown in FIG. 3G, in several embodiments, the sixth cutting pass may be made across one of the side field, strips of the second triple windrow set 104 (e.g., again depending on which side of the windrower 10 that the merger assembly 24 is configured to deposit materials). For example, as shown in FIG. 3G, the sixth cutting pass is being made across the first side field strip 110 of the second triple windrow set 104 since the merger assembly 24 is configured to laterally deposit several crop material along the right side of the windrower 10. Similar to that described above for the third and fourth cutting passes, the merger assembly 24 may be moved to its lowered or working position when making the sixth cutting pass. Thus, as the windrower 10 moves across the side field strip 110 of the second triple windrow set 104 in the second harvesting direction 120, the header 14 may sever the crop material from the ground and project the severed material rearwardly onto the conveyer 28 of the merger assembly 24. As shown in FIG. 3G, the severed crop material may then be conveyed laterally to the side of the windrower 10 via the conveyer 28 and deposited into the central field strip 108 of the second triple windrow set 102, thereby creating a second windrow or deposit of severed materials 232 within the central field strip 108 of the second triple windrow set 104 that is located on top of and/or adjacent to the first deposit of severed materials 224.

Figure 3H:
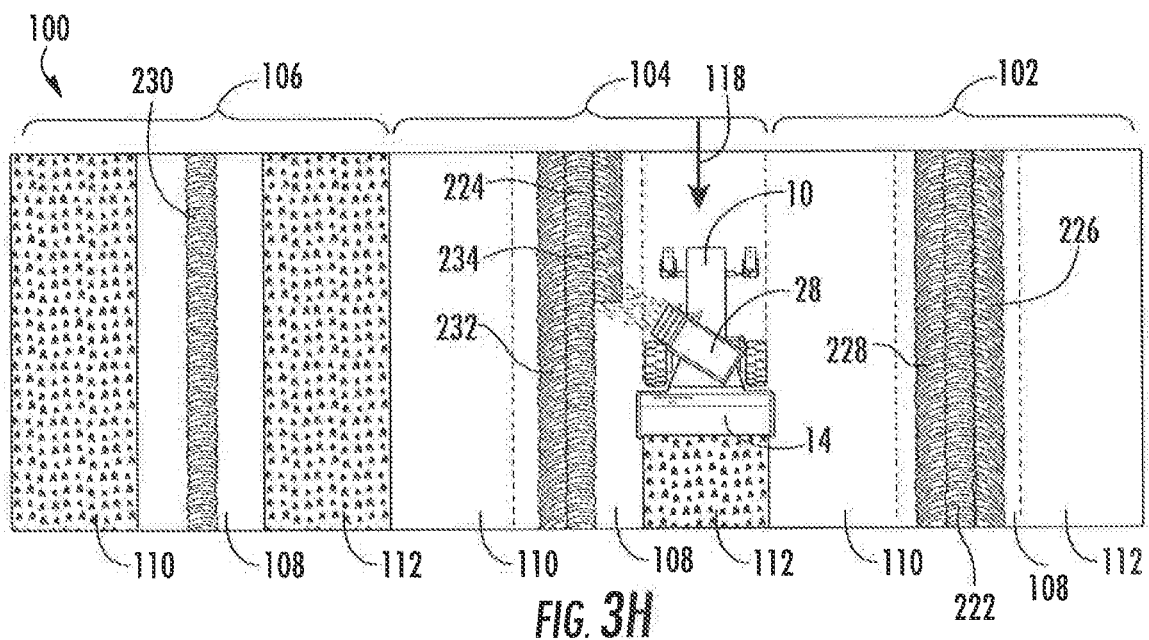

Referring now to FIG. 3H, following completion of the sixth cutting pass, the windrower 10 may be turned around to allow a seventh cutting pass to be made across the field 100 in the first harvesting direction 118. In several embodiments, the sixth cutting pass may be made across the remaining side field strip of the second triple windrow set 104. For example, as shown in FIG. 3H, the seventh cutting pass is being made across the second side field strip 112 of the second triple windrow set 102. Similar to that described above for the third, fourth, and sixth cutting passes, the merger assembly 24 may be moved to its lowered or working position when making the seventh cutting pass. Thus, as the windrower 10 moves across the remaining side field strip 112 of the second triple windrow set 104 in the first harvesting direction 118, the header 14 may sever the crop material from the ground and project the severed material rearwardly onto the conveyer 28 of the merger assembly 24. As shown in FIG. 3H, the severed crop material may then be conveyed laterally to the side of the windrower 10 via the conveyer 28 and deposited into the central field strip 108 of the second triple windrow set 104, thereby creating a third and final windrow or deposit of severed materials 234 within the central field strip 108 of the second triple windrow set 104 that is located on top of and/or adjacent to the existing first and second deposits of severed materials 224, 232. As a result, the first, second, and third deposits of severed materials 224, 232, 234 may collectively form a merged triple windrow extending along the central field strip 108 of the second triple windrow set 104.

The pattern of cutting passes described above with reference to FIGS. 3B-3H may then be continued while the harvesting operation is being performed across the remainder of the field 100. For instance, following the seventh cutting pass, an eighth cutting pass may be made across the central field strip 108 of yet another triple windrow set separate from the first, second, and third triple windrow sets 102, 104, 106 (e.g., a fourth triple windrow set (not shown) located adjacent to the third triple windrow set 106) to create an initial windrow or deposit of severed materials within the central field strip 108 of such triple windrow set. Thereafter, subsequent cutting passes may be made across the side field strips 110, 112 of the third triple windrow set 106 to allow second and third windrows or deposits of severed materials to be deposited within the central field strip 108 of the third triple windrow set 106, thereby forming a merged triple windrow that extends across the central field strip 108 of the third triple windrow set 106.

It should be appreciated that the methods described above with reference to FIGS. 2A-2H and 3A-3H only provide examples of suitable methods for creating merged triple windrows. In general, the present subject matter is intended to cover various alternative embodiments in which, following an initial cutting pass made along a first triple windrow set, one or more intermediate cutting passes are made along one or more differing triple windrow sets prior to any subsequent passes being made within the first triple windrow set. For instance, in one embodiment, the central field strip of each triple windrow set defined across the field may be cut prior to depositing the second and third windrows within any of the triple windrow sets.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for creating merged triple windrows within a field, the method comprising:

performing a first cutting pass across a first triple windrow set of the field in a first harvesting direction so as to sever materials from the ground and deposit the severed materials within a first cut strip created by the first cutting pass to form a first deposit of severed materials, the first triple windrow set of the field including a first adjacent uncut strip of materials disposed along one side of the first cut strip and a second adjacent uncut strip of materials disposed along the opposed side of the first cut strip;

performing a second cutting pass across a second triple windrow set of the field subsequent to the first cutting pass in a second harvesting direction opposite the first harvesting direction so as to sever materials from the ground and deposit the severed materials within a second cut strip created by the second cutting pass to form a first separate deposit of severed materials, the second triple windrow set being defined by a separate portion of the field than the first triple windrow set;

performing a third cutting pass across the first triple windrow set of the field subsequent to the first and second cutting passes to sever the materials within the first adjacent uncut strip of materials and deposit the severed materials within the first cut strip to form a second deposit of severed materials within the first cut strip;

performing a fourth cutting pass across the first triple windrow set of the field or the second triple windrow set of the field subsequent to the third cutting pass to sever the materials within the second adjacent uncut strip of materials and deposit the severed materials within the first cut strip to form a third deposit of severed materials within the first cut strip or to sever the materials within a first adjacent uncut strip of materials disposed along one side of the second cut strip and deposit the severed materials within the second cut strip to form another deposit of severed materials within the second cut strip in association with the first separate deposit of severed materials, respectively; and performing a fifth cutting pass across a third triple windrow set of the field subsequent to the fourth cutting pass to sever materials from the ground and deposit the severed materials within a third cut strip created by the fifth cutting pass to form a second separate deposit of severed materials, the third triple windrow set being defined by a separate portion of the field than the first and second triple windrow sets.

2. The method of claim 1, wherein performing the third cutting pass comprises performing the third cutting pass across the field in the first harvesting direction.

3. The method of claim 2, wherein performing the fourth cutting pass comprises performing the fourth cutting pass across the field in the second harvesting direction.

4. The method of claim 1, wherein the windrower includes a merger assembly configured to be moved between a working position and a non-working position.

5. The method of claim 4, wherein the first and second cutting passes are made with the merger assembly at the non-working position such that the severed materials from the first and second cutting passes are deposited directly below the windrower.

6. The method of claim 4, wherein the third and fourth cutting passes are made with the merger assembly at the working position such that the severed materials from the third and fourth cutting passes are projected laterally outwardly to one side of the windrower.

7. The method of claim 1, wherein the first, second, third, and fourth cutting passes are made using a windrower, further comprising guiding the windrower across the field using location data received from a positioning device of the windrower when making at least one of the first, second, third, or fourth cutting passes.

8. The method of claim 1, wherein the fourth cutting pass is performed across the second triple windrow set of the field.

9. The method of claim 8, further comprising performing a sixth cutting pass across the first triple windrow set of the field subsequent to the fifth cutting pass to sever materials from the second adjacent uncut strip of materials and deposit the severed materials within the first cut strip to form the third deposit of severed materials within the first cut strip.

10. The method of claim 1, wherein the fourth cutting pass is performed across the first triple windrow set of the field.

11. The method of claim 10, further comprising performing a sixth cutting pass across the second triple windrow set of the field subsequent to the fifth cutting pass to sever the materials within the first adjacent uncut strip of materials disposed along one side of the second cut strip and deposit the severed materials within the second cut strip to form a second deposit of severed materials within the second cut strip in association with the first separate deposit of severed materials.

12. The method of claim 11, further comprising performing a seventh cutting pass across the second triple windrow set of the field subsequent to the sixth cutting pass to sever the materials within a second adjacent uncut strip of materials disposed along an opposed side of the second cut strip and deposit the severed materials within the second cut strip to form a third deposit of severed materials within the second cut strip in association with the first separate deposit of severed materials and the second deposit of severed materials.

13. A method for creating merged triple windrows within a field, the method comprising:

performing a first cutting pass across a first central field strip of a first triple windrow set of the field in a first harvesting direction so as to sever materials from the ground and deposit the severed materials within a first central field strip to form a first deposit of severed materials, the first triple windrow set further including a first side field strip disposed along one side of the first central field strip and a second side field strip disposed along the opposed side of the first central field strip;

performing a second cutting pass across a second central field strip of a second triple windrow set of the field subsequent to the first cutting pass in a second harvesting direction opposite the first harvesting direction so as to sever materials from the ground and deposit the severed materials within the second central field strip to form a separate deposit of severed materials, the second triple windrow set being defined by a separate portion of the field than the first triple windrow set;

performing two subsequent cutting passes across the first triple windrow set subsequent to the first and second cutting passes to sever the materials within the first and second side field strips and deposit the severed materials within the first central field strip to form a merged triple windrow within the first central field strip; and performing a further cutting pass across a third triple windrow set of the field subsequent to at least one of the two subsequent cutting passes to sever materials from the ground and deposit the severed materials within a third cut strip created by the further cutting pass to form a second separate deposit of severed materials, the third triple windrow set being defined by a separate portion of the field than the first and second triple windrow sets.

* * * * *